US009375659B2

(12) United States Patent
Bird et al.

(10) Patent No.: US 9,375,659 B2
(45) Date of Patent: Jun. 28, 2016

(54) SOLIDS CONTAINMENT DEVICE FOR USE WITHIN OR IN ASSOCIATION WITH HYDROMECHANICAL GREASE INTERCEPTOR

(75) Inventors: Andrew Bird, Shanty Bay (CA); James Brian Mantyla, Barrie (CA); John Ward, Midhurst (CA); James Edwin Teskey, Barrie (CA)

(73) Assignee: CANPLAS INDUSTRIES LTD., Barrie (CA)

( * ) Notice: Subject to any disclaimer, the term of this patent is extended or adjusted under 35 U.S.C. 154(b) by 908 days.

(21) Appl. No.: 13/546,399

(22) Filed: Jul. 11, 2012

(65) Prior Publication Data

US 2013/0313180 A1     Nov. 28, 2013

(30) Foreign Application Priority Data

May 23, 2012   (CA) .................................... 2778016

(51) Int. Cl.
| | |
|---|---|
| *B01D 36/04* | (2006.01) |
| *C02F 1/40* | (2006.01) |
| *E03F 5/16* | (2006.01) |
| *B01D 21/02* | (2006.01) |
| *B01D 21/00* | (2006.01) |

(52) U.S. Cl.
CPC ........ *B01D 21/0012* (2013.01); *B01D 21/0033* (2013.01); *B01D 36/04* (2013.01); *C02F 1/40* (2013.01); *E03F 5/16* (2013.01)

(58) Field of Classification Search
None
See application file for complete search history.

(56) References Cited

U.S. PATENT DOCUMENTS

| | | | | |
|---|---|---|---|---|
| 1,474,938 | A | * | 11/1923 | Marsh ........................... 210/305 |
| 2,198,189 | A | * | 4/1940 | Gordon .................. B01D 46/00 55/301 |
| 4,319,998 | A | * | 3/1982 | Anderson ....................... 210/86 |
| 4,340,470 | A | * | 7/1982 | Van Mol ................ B01D 29/01 210/447 |
| 4,400,274 | A | | 8/1983 | Protos |
| 4,689,145 | A | * | 8/1987 | Mathews et al. .......... 210/170.03 |
| 4,940,539 | A | | 7/1990 | Weber |
| 5,114,472 | A | * | 5/1992 | Eckert ................... C22B 21/066 164/134 |
| 5,360,555 | A | | 11/1994 | Batten |
| 5,431,826 | A | | 7/1995 | Becker et al. |
| 5,827,425 | A | | 10/1998 | McKinnon |
| 5,993,646 | A | | 11/1999 | Powers |
| 6,029,479 | A | * | 2/2000 | Pattee ................ B01D 17/0202 210/314 |
| 6,517,715 | B1 | | 2/2003 | Batten et al. |
| 6,616,834 | B2 | * | 9/2003 | Anderson ..................... 210/155 |

(Continued)

FOREIGN PATENT DOCUMENTS

| | | | |
|---|---|---|---|
| AT | 383055 B | * | 5/1987 |
| CA | 2299134 A1 | | 8/2001 |

(Continued)

*Primary Examiner* — Thomas M Lithgow
(74) *Attorney, Agent, or Firm* — Hoffmann & Baron, LLP

(57) ABSTRACT

A solids containment device for use in n hydromechanical grease interceptor, sized and shaped to be removably carried within the hydromechanical grease interceptor. The solids containment device includes a containment body with side and end walls, an open top, a wastewater inflow opening and an outflow opening. At least one removable solids separating screen is carried within the containment body, and is located between the inflow opening and the outflow opening. The outflow opening is directed away from the outflow aperture of the hydromechanical grease interceptor, in order to encourage a generally diagonal flow path for the wastewater stream within the hydromechanical grease interceptor, thereby encouraging separation of fats, oils and grease.

15 Claims, 7 Drawing Sheets

(56) References Cited

U.S. PATENT DOCUMENTS

| | | | |
|---|---|---|---|
| 6,800,195 B1 | 10/2004 | Batten et al. | |
| 6,849,176 B1 * | 2/2005 | Batten et al. | 210/97 |
| 6,895,978 B2 * | 5/2005 | Midkiff | B60S 3/042 134/104.1 |
| 7,011,752 B2 | 3/2006 | Broeders et al. | |
| 7,125,472 B2 * | 10/2006 | Baker | B01D 29/03 162/233 |
| 7,300,588 B2 | 11/2007 | Broeders et al. | |
| 7,452,472 B2 | 11/2008 | Hodgekins et al. | |
| 7,596,845 B2 | 10/2009 | Batten et al. | |
| 7,641,805 B2 | 1/2010 | Batten et al. | |
| 7,682,509 B2 | 3/2010 | Murray et al. | |
| 8,007,016 B2 | 8/2011 | Mantyla et al. | |
| 8,252,172 B2 * | 8/2012 | Hall | C02F 1/002 210/199 |
| 2006/0237362 A1 * | 10/2006 | Weymouth | B01D 21/0012 210/532.1 |
| 2008/0116151 A1 * | 5/2008 | Suthard et al. | 210/791 |
| 2013/0206682 A1 * | 8/2013 | Jarchau | B01D 29/012 210/497.3 |

FOREIGN PATENT DOCUMENTS

| | | | |
|---|---|---|---|
| CA | 2672865 A1 | | 8/2001 |
| CA | 2562825 A1 | | 4/2008 |
| EP | 2431128 A1 | * | 3/2012 |
| FR | 2696946 A1 | * | 4/1994 |
| GB | 2228751 A | * | 9/1990 |
| GB | 2305617 A | * | 4/1997 |
| JP | 04-037689 U | * | 3/1992 |

* cited by examiner

SOLIDS CONTAINMENT DEVICE FOR USE WITHIN OR IN ASSOCIATION WITH HYDROMECHANICAL GREASE INTERCEPTOR

CROSS-REFERENCE TO RELATED APPLICATIONS

This application claims the benefit of Canadian Application No. 2,778,016, filed May 23, 2012, the contents of which is incorporated by reference herein.

FIELD OF THE INVENTION

This invention relates generally to the field of wastewater management and in particular to grease interceptors of the sort that are used on wastewater outflows from, for example, commercial food establishments. Grease interceptors are typically used to prevent fats, oils and grease (FOG) from entering the sanitary sewage system. Most particularly, this invention relates to a solids containment device for use in or in conjunction with such a hydromechanical grease interceptor.

BACKGROUND OF THE INVENTION

In many food preparation facilities, such as commercial kitchens and restaurants, the sink is a major tool used for disposing of various types of food waste. In some cases liquid food wastes, such as FOG are poured down the sink, and in other cases a mechanical chopper such as a garborator is used to shred the food waste as it leaves the sink and enters the wastewater system. Many food preparation establishments, such as commercial restaurants and the like, have multiple sinks for such food waste disposal.

In many jurisdictions, the disposal from commercial kitchens of FOG and FOG laden debris into the sanitary sewage system is prohibited. There are a number of reasons why this is so, including the ability of those types of materials to clog or plug sanitary sewage systems and the difficulty of adequately treating such materials in a sewage treatment facility. Therefore, many jurisdictions require that these materials be removed from the wastewater stream before permitting the wastewater stream to be added to the sanitary sewer system.

As a result, devices known as grease interceptors have been developed. These grease interceptors are connected to the wastewater effluent stream from the food preparation kitchen or other facility and are located before the sanitary sewer, typically within the kitchen. The grease interceptors may take a number of forms, but typically consist of an in-line container which is mounted at or below grade within the wastewater discharge system downstream of all of the sinks and the like. The container includes features that are configured to allow fats, oils and grease to float to the surface of the container where they can be skimmed off and physically removed for controlled disposal. In this way these wastes are removed from the wastewater before the wastewater enters the sanitary sewer system. Some examples of prior art grease interceptors include the following:

U.S. Pat. No. 4,400,274
U.S. Pat. No. 4,940,539
U.S. Pat. No. 5,360,555
U.S. Pat. No. 5,431,826
U.S. Pat. No. 5,827,425
U.S. Pat. No. 5,993,646
U.S. Pat. No. 6,517,715
U.S. Pat. No. 6,800,195
U.S. Pat. No. 7,011,752
U.S. Pat. No. 7,300,588
U.S. Pat. No. 7,452,472
U.S. Pat. No. 7,596,845
U.S. Pat. No. 7,641,805
U.S. Pat. No. 7,682,509
U.S. Pat. No. 8,007,016
Canadian Patent No. 2,299,134
Canadian Patent No. 2,562,825
Canadian Patent No. 2,672,865

While these different inventions all have various features and benefits, a consistent problem that grease interceptors have to deal with is non-floating solid materials that may be also washed down the sink drain and into the grease interceptor. These materials are organic or inorganic and they can become trapped in the layer of fats, oils and grease accumulated at the surface of the grease interceptor or settle out by gravity and then decompose anaerobically. This decomposition of solids creates very foul odours and noxious gases which makes emptying the FOG from the grease interceptor container highly undesirable and a very unpleasant job. Therefore, efforts have been made in the prior art to eliminate the ability of solids to enter into the separation chamber of the grease interceptor. However, these prior art devices are often complicated, cumbersome, expensive to implement and may be difficult to clean due to permanently installed baffles. Further, different types of commercial kitchen establishments have different types of waste. Some produce solids that are large, some produce fine solids, and some are solids free. What is desired is an easy to use and effective way of removing solids from the wastewater stream before they can enter and decompose or otherwise plug the grease interceptor or downstream drains. What is also desired is a way to adapt the solid separation capabilities of the grease interceptor to suit the waste produced by a specific kitchen or restaurant.

SUMMARY OF THE INVENTION

The present invention is directed to a solids containment device, which is in the nature of an accessory that can be added into an existing grease interceptor as needed, depending upon the nature of the waste being produced and disposed of by a specific kitchen or food preparation facility. In particular this device may be suspended in the container, as needed. The device includes an inlet opening adjacent to an inlet aperture on the grease interceptor or a solids interceptor itself. Influent flowing into the interceptor first flows directly into the suspended solids containment device. The solids containment device then filters out solid materials and allows the liquids, containing the FOG to carry on through the containment device. An outflow aperture is provided on the solids containment device which directs the wastewater stream away from the outlet on the main container of the interceptor. Most preferably the outlet is located on the bottom of the solids containment device. In this way the wastewater stream follows a path into the container that is first down diagonally away from the outlet aperture and then diagonally upward through the main chamber of the grease interceptor container generally towards the outlet aperture permitting FOG enough time to achieve a floating separation from the wastewater stream. The container is much larger in cross-sectional area than the wastewater inflow stream and so the velocity of the wastewater through the container is quite slow, permitting time for the FOG to separate through gravity or hydraulic (floating) separation. Most preferably the solids containment device is provided with a closed top to prevent overflow which top may be easily opened when necessary. The solids containment device simply slides into place in the grease interceptor container, permitting easy insertion or removal and emptying. Removal of the container is facilitated by integrally molded lifting features formed in the container.

Accordingly, the present invention provides:

a solids containment device for a wastewater stream passing through a hydromechanical grease interceptor, said grease interceptor including a wastewater inflow aperture and an outflow aperture, said solids containment device comprising:

a. a containment body having bottom, side and end walls, an openable top, a wastewater inflow opening and an outflow opening, said containment body being sized and shaped to be removably carried within said grease interceptor wherein said inflow opening is aligned to said inflow aperture to permit wastewater flowing into said grease interceptor to flow into said containment body; and b. at least one removable solids separating screen carried within said containment body between said inlet opening and said outlet opening;

wherein said outflow opening is directed away from the interceptor, said outflow aperture of said interceptor and toward the bottom to create a generally diagonal flow path for said waste stream through said interceptor to encourage fat, oil and grease (FOG) separation.

BRIEF DESCRIPTION OF THE DRAWINGS

Reference will now be made, by way of example only, to preferred embodiments of the inventions and in which.

DETAILED DESCRIPTION OF THE PREFERRED EMBODIMENTS

Figure 1:
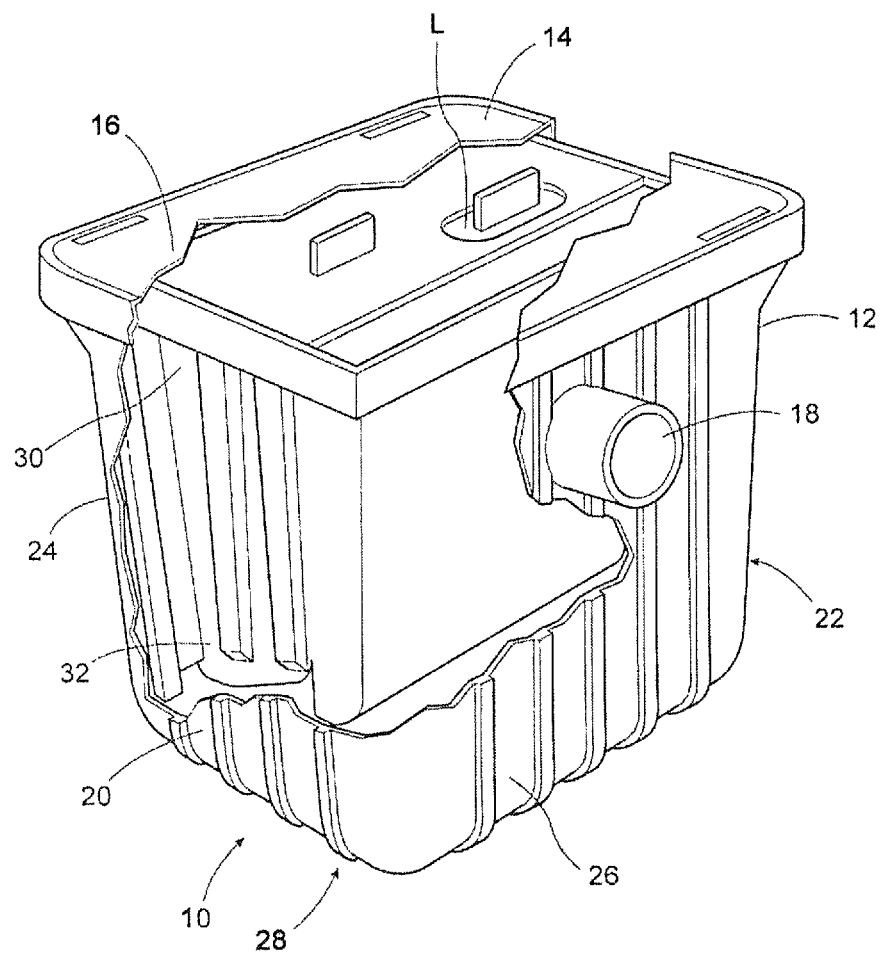
FIG. 1 is a view of the present invention, shown in break away section, suspended within a hydromechanical grease interceptor.

FIG. 1 shows an inline interceptor 10 including a main body 12, a lid 14, an inflow aperture 16 (seen in FIG. 7), and an outflow aperture 18. The grease interceptor 10 includes two side walls 20, 22, two end walls, 24, 26 a bottom 28 and the top lid 14. When the lid 14 is in place, the only openings are the wastewater inflow aperture 16 in end wall 24 (see FIG. 7) and a wastewater outflow aperture 18 in end wall 26. Also shown is a solids accessory device 32 suspended in the main body 12 according to the present invention and which is described in more detail below. As will be understood by those skilled in the art, the outflow aperture 18 is positioned so that the water that enters at inlet aperture 16 can drain out at outlet aperture 18. These apertures are typically connected by suitable pipe connections to the wastewater drain pipe. Most typically the interceptor 10 will be installed below grade or partially below grade to allow the apertures to line up with any below grade wastewater piping.

Figure 2:
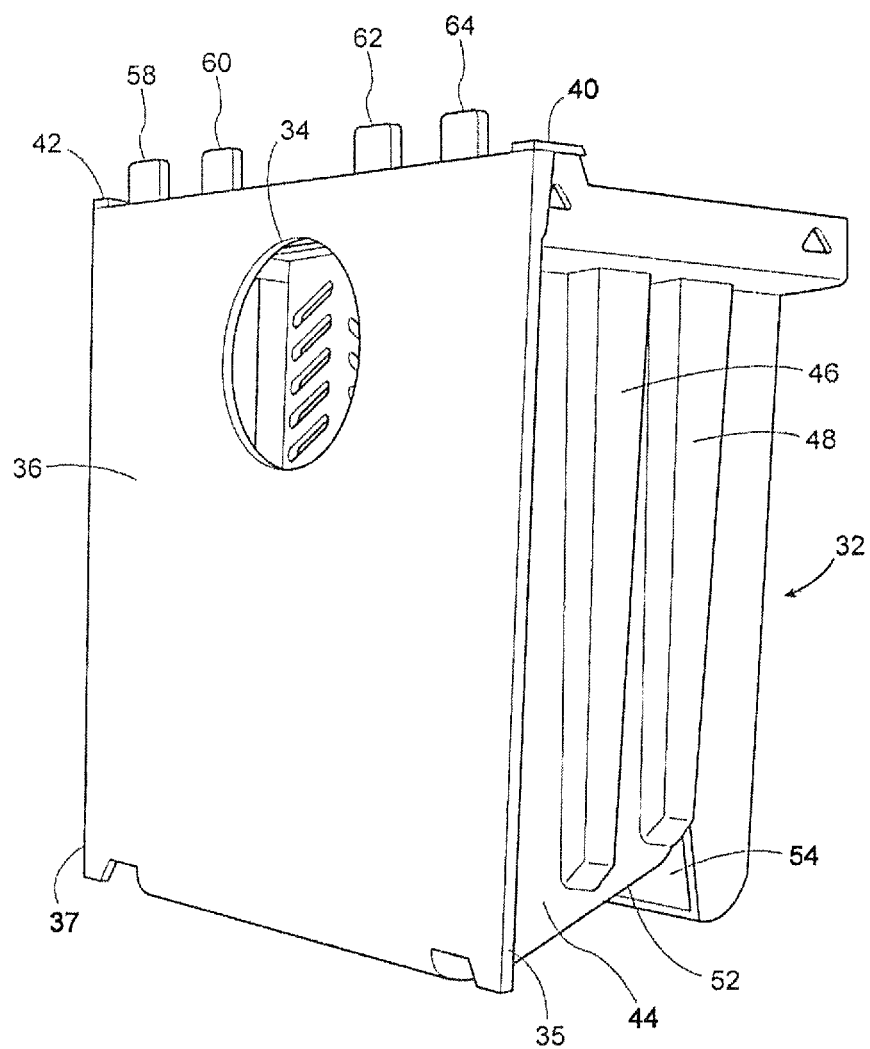
FIG. 2 is a side perspective view showing the solids containment device from an inlet opening side.

FIG. 2 shows the solids accessory device 32 of FIG. 1 in more detail. As can be seen, an inlet opening 34 is formed on an upstream end wall 36. The upstream end wall 36 is preferably sized and shaped to register with the end wall 24 of the interceptor container, so that when the device 32 is placed within the interceptor 10, it is held in place. To this end the side edge 35 (and on the opposite side the side edge 37) act as rails that fit within opposed slots on the main container wall. The slots may be typically used to house an inflow baffle, for example, as shown in prior U.S. Pat. No. 6,517,715. With the inflow baffle removed, the slot is then open for the rails (i.e. side edges 35, 37) of the device 32. In this way the present solids accessory device 32 can be used to convert a compatible grease interceptor to one with a solids retaining capability as desired and as explained more fully below.

Preferably tabs 40 and 42 are formed at the top of the upstream end wall 36 to engage a top edge of a receiving detail in the main container to limit the movement of the device 32 downwardly into the main container. In this way, between the rails (side edges 35, 37) and the tabs 40 and 42 the device 32 is suspended in the grease interceptor container somewhat above the bottom 28 of the grease interceptor 10. While this is the preferred form of the invention, because it permits the wastewater to flow around and beneath the device 32, it will be appreciated by those skilled in the art that there are other ways to support the device 32 within the grease interceptor 10. For example, the present invention also comprehends resting the end of the device 32 on the bottom 28, or using support posts or the like within the grease interceptor 10 to support the device 32. However, the configuration depicted in the drawings provides goods support and positions the device 32 effectively in the chamber while at the same time permitting it to be easily removed and emptied as required, without the need for tools or the like. Good results have been achieved with the design as shown.

Figure 7:
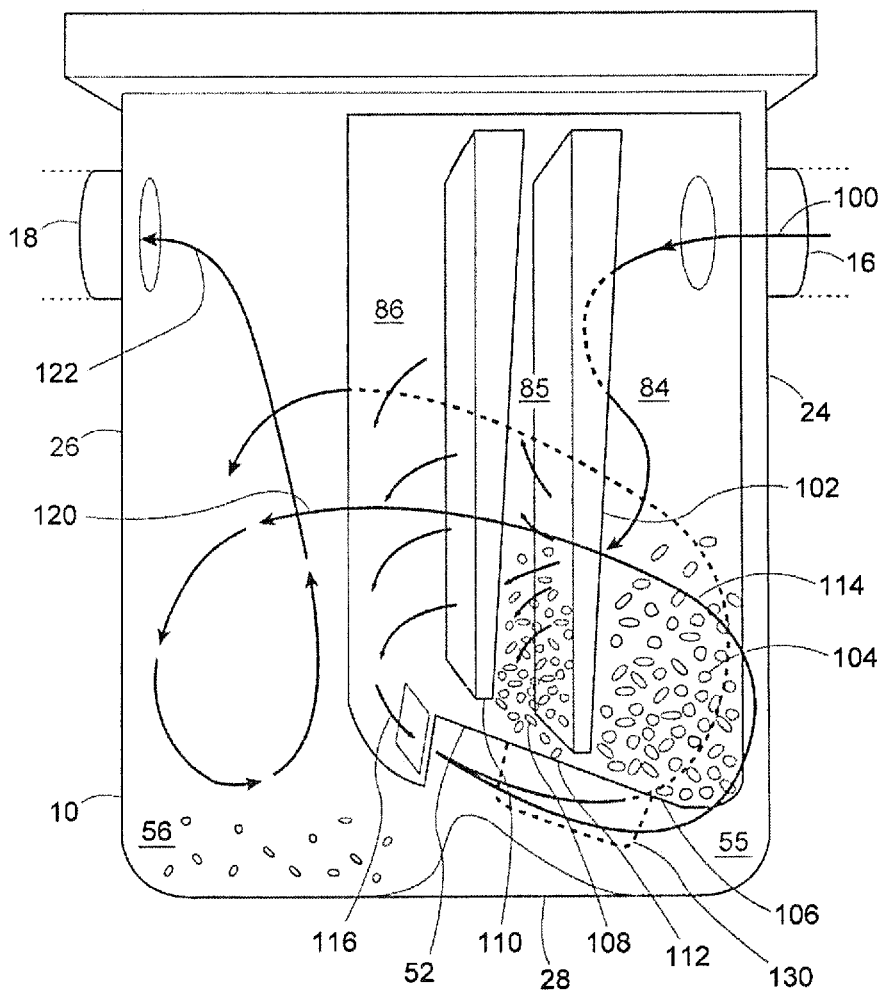
FIG. 7 is a schematic view of the solids containment device of the present invention in use in a solids interceptor format hydromechanical grease interceptor.

A continuous side wall 44 is shown for the device 32 which includes a first screen slot location 46 and a second screen slot location 48. Symmetrical slots are formed in the opposite side wall, to form an open topped space into which a solids separation screen can be easily inserted or removed from above as explained below. Although two slots have been found to give good results, the present invention comprehends that more or fewer slots could be used without departing from the scope of the invention. The side wall 44 of the solids accessory device 32 is preferably inset from the side edge 35 of the upstream end wall 36. Although not visible in this view, the same would apply for the other side, with an opposite side wall 50 (see FIG. 3) being inset somewhat from the lateral edge of the upstream end wall 37. Also shown are an inclined bottom wall 52 and an outlet opening 54. As can be seen in FIG. 7 the inclined bottom wall 52 is located above the bottom wall 28 of the main container and extends lower into the container at an upstream end 55 than at the downstream end 56.

Also shown in FIG. 2 are upwardly extending orientation tabs 58, 60, 62, and 64 which are sized and shaped to interface with ribs formed on an underside of the lid 14. These tabs also help to align and keep the device 32 in position in the grease interceptor 10 by optionally interfacing with features found in the lid 14, depending upon the size of the interceptor.

Figure 3:
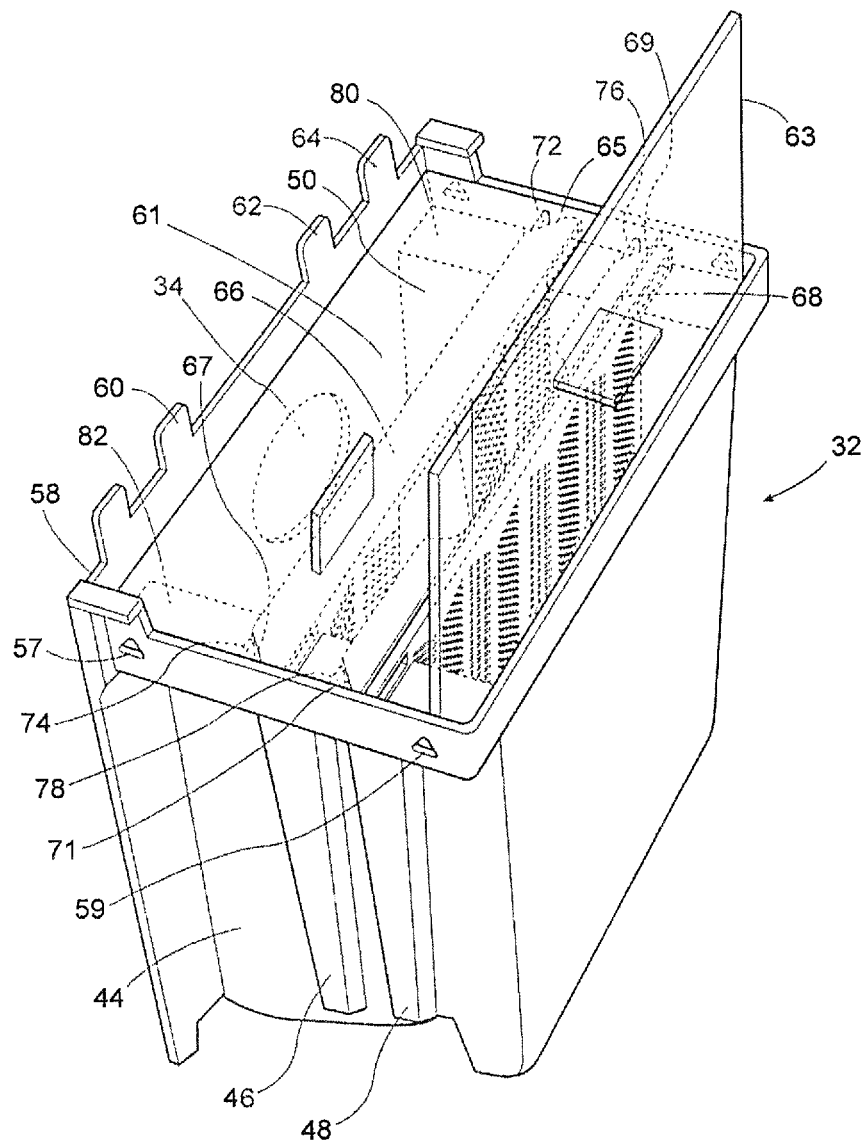
FIG. 3 is a top perspective view from above the solids containment device of FIG. 2 showing removable solid separation screens housed within slots.

FIG. 3 shows the solids containment accessory 32 of FIG. 2 from above. An end wall 58 is shown together with the side wall 44. A first solids separating screen 66 is shown adjacent to the inlet opening, and a second solids separating screen 68 is located downstream of the first solids separating screen 66. As shown, the screens are housed in the screen slots receiving details 46 and 48. It will be noted that the first and second solids separating screens are located between the inlet opening 34 and the outlet opening 54 (See FIG. 2). In this manner all of the wastewater flowing into the grease interceptor 10 and then into the device 32 is required to flow through the screens 66, 68.

Most preferred according to the present invention is that each of the screens 66 and 68 are provided with angled edges 65, 67 and 69, 71 respectively. As well, orientation tabs 72, 74, 76 and 78 are formed into upper lips 80 and 82 of the device 32. The orientation tabs are sized and shaped to only permit the screens 66, 68 to be installed in the correct place and orientation. If the screens are reversed or inserted into the incorrect slots, the orientation tabs will prevent the screens from being fully inserted, which in turn will prevent the lid 14 from being closed. In this way the present invention provides for a way of ensuring that the screens 66, 68 are always correctly positioned and oriented in the device 32.

Figure 4:
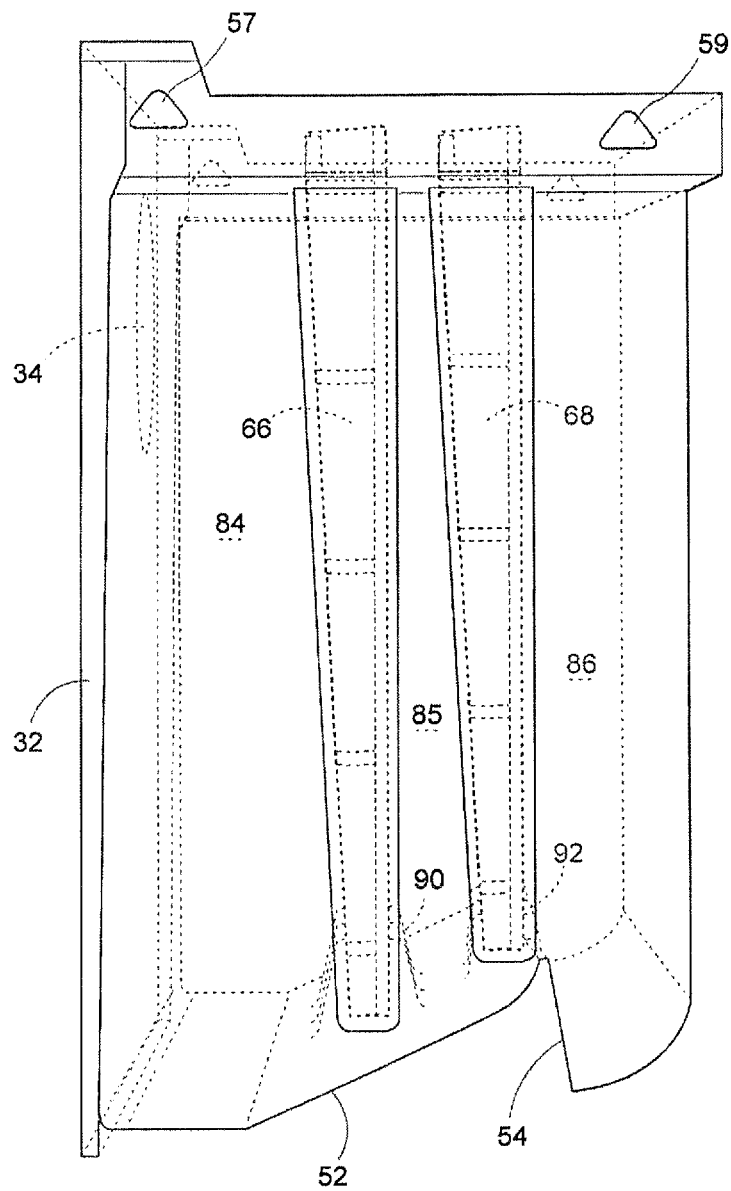
FIG. 4 is a side view of the solids containment device of FIGS. 2 and 3 showing the screen components in place in ghost outline.

FIG. 4 shows the side view of the solids containment accessory. As can be seen, the inlet opening 34 flows into a first separation chamber 84 wherein larger solids particles are screened by the first solids screening filter 66. Immediately opposite the inlet opening 34 is an unperforated deflecting surface S (see FIG. 6), which deflects the flow of water down into the first separation chamber 84. In this way the main hydraulic forces are not applied to the area of the screening filter 66 having slots or openings. The second solids screening filter 68 screens out smaller particles in a chamber 85 after which the fluid passes through a final chamber 86 and then out through the outlet 54. The outer face of bottom wall 52 is inclined as previously described to permit the wastewater outflow stream to be angled generally downwardly and generally away from the outflow aperture 18 in the body 12 as shown in FIG. 7.

Also shown in FIG. 4 are a number of locating tabs 90 and 92, which are provided at the bottom of the device 32. These tabs are angled to easily guide the screens 66 and 68 respectively into position at the bottom of the slots 46 and 48. The tabs also help to support the screens in place against hydrostatic pressure created by the flow of water that is coming in through the device 32. It can now be appreciated that with the lid 14 removed, the screens 66 and 68 may be easily inserted and removed from the device 32 with no need for tools or the like. The screens are simply lifted vertically out of the slots to remove them and are reinserted vertically down in the slots to relocate them, and in this way the device 32 can easily be cleaned of accumulated solids debris that it will collect.

Figure 5:
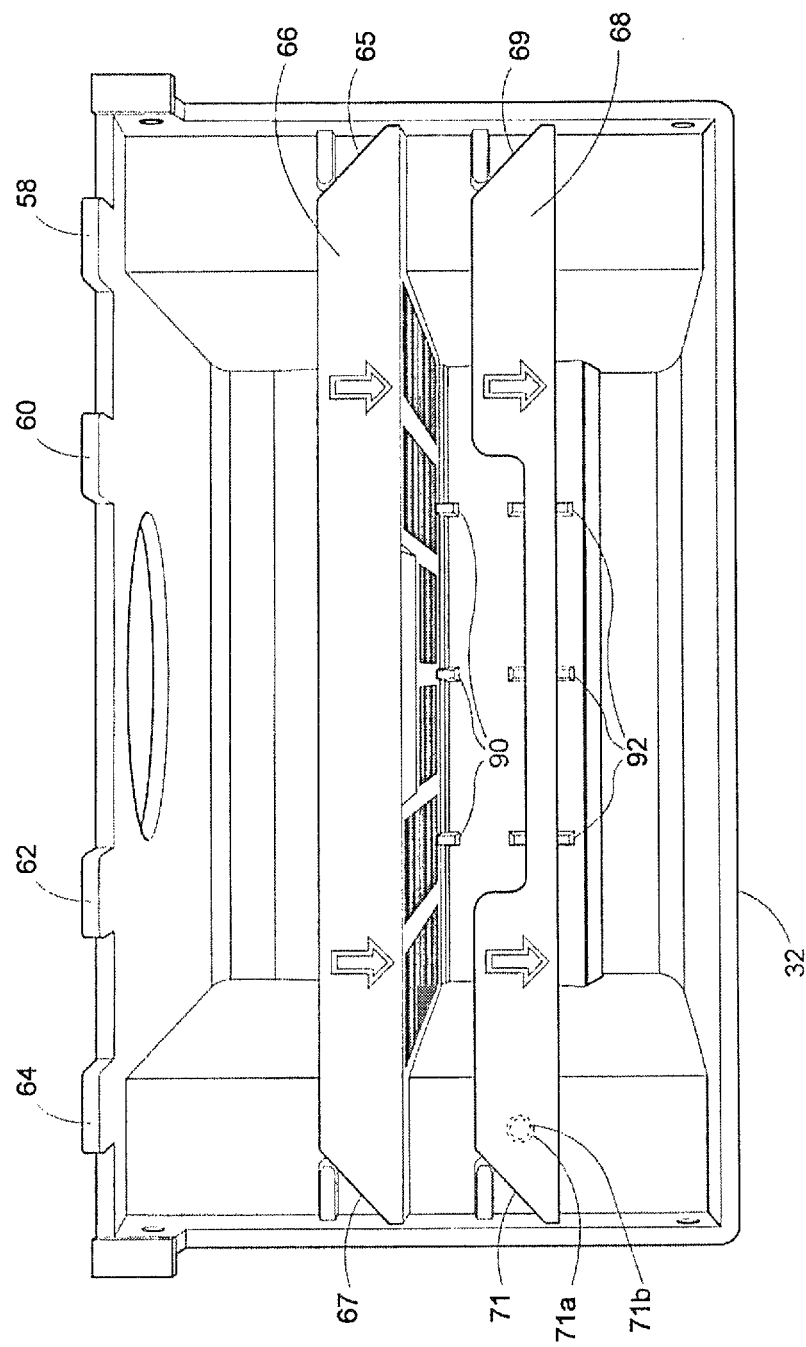
FIG. 5 is a top view of the solids containment device of FIG. 3.

Also shown are hinge holes 57, 59, which are to locate top hinged covers 61, 63 (see FIG. 3). These top hinged covers 61, 63 provide a way of closing the open top of the device 32 so as to prevent overflow, and would be located directly underneath the lid 14 of the grease interceptor 10. The present invention comprehends forming lifting handles L (see FIG. 1) in the lids, which make it easier to remove the device 32 from the interceptor 10. It has been found that using rounded triangular shaped hinge holes 57, 59 facilitate the easy pivoting of the lids although round holes are also shown in FIG. 5 and are also comprehended. The present invention comprehends other ways to prevent overflow, such as sealing an open top of the device to an underside of the container lid 14 or the alternate use of a one-piece panel to close the top of the device.

FIG. 5 is a view of the solids accessory device 32 from above further showing that the solids separating screens 66, 68 are held in place in the device 32. Further, tabs 90 and 92 can be seen helping to secure the base of the solids separating screens 66, 68 in place against the bottom of the container. Also the orientation tabs are shown more clearly as well as the angled edges 65, 67 and 69, 71. A post 71a is formed on the ledge of the solids containment device 32 which fits into a post hole 71b formed in the screen 68. If the screens are put in the wrong slots the post 71a will not find posthole 71b meaning the screen won't fully fit down onto the ledge, which in turn will prevent the lids from closing and thus encouraging a repositioning into the correct slots.

Figure 6:
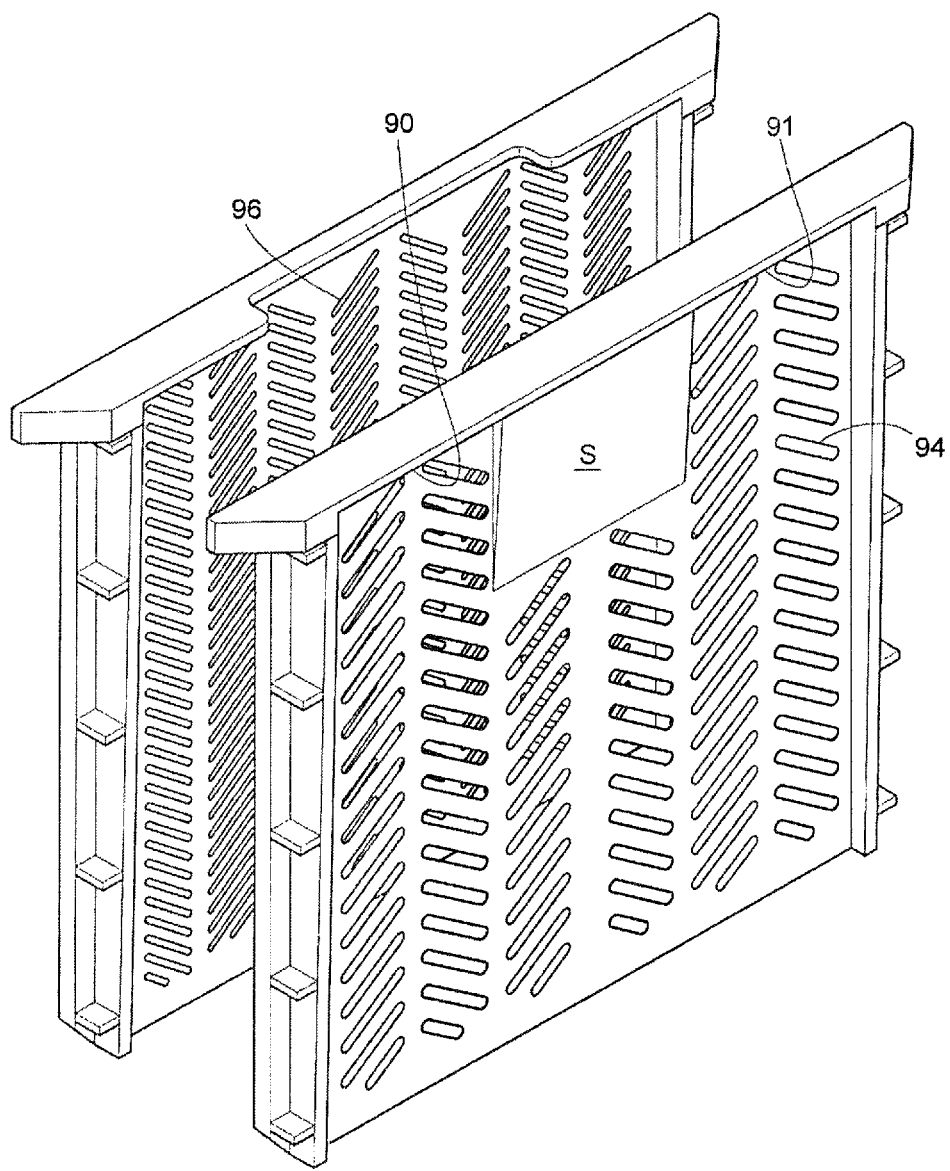
FIG. 6 is a perspective view of the screens from an upstream direction according to the present invention.

FIG. 6 shows the solids separating screens 66, 68 separated from the device. As can be appreciated these screens 66, 68 may be easily lifted vertically out of the slots using the hollowed edges 90 and 91 to facilitate cleaning of the solids containment accessory. Further, as can be seen, the first solids screen 66 includes a plurality of slots 94 having a width of about one centimeter. The second solids containment screen 68 includes a plurality of slots 96 having a much smaller width of about 3 millimeters. In this way, the larger particles will be separated out by the first screen 66 and smaller particles will be separated out by the second screen 68. Most preferably the screens 66, 68 are made from an easy to clean material such as plastic. Most preferably the screens are made through an injection moulding process whereby the screens can be easily made in quantity and for a reasonable cost. Alternative embodiments include overmolding of a finer screen material within a supporting frame or simple perforated screens which could be produced from metal or plastic and could be self-supporting. The screen design shown, which takes the appearance of inclined chevrons, has been found to provide suitable results. However, those skilled in the art will recognize that other screen patterns can also be used which will achieve reasonable results. What is most preferred is to have two screens, with a coarse screen 66 followed by a fine screen 68 to separate out all of the solids having a size larger than the fines screen openings. The actual size can vary depending upon the type of waste that is being screened for. For example the fine screen can be made fine enough to filter out coarse coffee grounds if desired. Also, the screen design should be such that it permits the water to flow through relatively unimpeded to prevent a damming effect.

FIG. 7 shows the present invention in operation. As can be seen, the inflow of wastewater occurs at 100 wherein the wastewater impinges upon the first coarse solids separation screen at area S (FIG. 6). The larger solid particles 104 are deflected by an unperforated deflecting surface S (FIG. 6) and are separated out of the flow accumulating at inclined bottom 106 in chamber 84. Further smaller particles 108 are carried through the first separating screen and then impinge on the second separating screen at 110 in chamber 85. These smaller particles then are trapped and accumulate at 112 allowing the water to flow into chamber 86. From there the solid separated wastewater is directed downwardly and outwardly at 116 in a direction away from the outflow aperture 18 of the interceptor 10. As the solids containment device is narrower in width than the interceptor container, the flow naturally divides around the outside of the solids containment accessory at 114 and proceeds along a diagonal as shown by arrow 120. In this manner fats, oils and grease can accumulate at the surface before the wastewater exits at 122 when operated as a solids capture device only. An outlet baffle (not shown) can be positioned over the outlet aperture 18 to prevent any FOG from exiting through the outlet aperture 18 when operation as a combined solids and FOG capture unit is desired.

In some cases it may be preferred not to install a baffle over the outflow to prevent fats, oils and grease from leaving the container through the outflow aperture 18. For example a grease interceptor could be placed downstream of solids interceptor containing the solids accessory device, in which case the grease interceptor would be used for removing the FOG before the wastewater enters the sanitary sewer system.

The most preferred form of the invention is to be made from molded polymeric material, such as PP, PVC, ABS, PE and the like, and polypropylene (PP) plastic provides good results. Most preferably the device 32 is injection molded, or structural foam molded.

The present invention further comprehends using deflector features on the underside of the device 32 to direct the flow of wastewater in a particular way. Such deflector features may include angled, lateral or vertical projections to direct, manage or diffuse flow around the device 32. An example is shown in dotted outline at 130.

It will be appreciated that the foregoing description is intended by way of example only and that many variations and modifications to the invention are comprehended without departing from the broad spirit of the claims which are attached. Some of these variations are discussed above and others will be apparent to those skilled in the art. For example, while the preferred form of the invention is moulded plastic, metal or other materials could also be used. However, plastic is preferred for its low cost, and ease of manufacture among other reasons.

The invention claimed is:

1. A solids containment device for use in a hydromechanical grease or solids interceptor having a wastewater inflow aperture and a wastewater outflow aperture allowing a wastewater stream to pass through the interceptor, said solids containment device comprising:
    a containment body having (a) walls defining a chamber with an open top, (b) a wastewater inflow opening, and (c) a wastewater outflow opening, said containment body being sized and shaped to be removably carried within said interceptor with said inflow opening aligned with said inflow aperture to permit said wastewater stream flowing into said interceptor through said inflow aperture to flow into said chamber through said inflow opening and out from said chamber through said outflow opening; and
    at least one solids separating screen removably carried by said containment body within said chamber between said wastewater inflow opening and said wastewater outflow opening, said at least one solids separating screen having screen openings sized for blocking the passage of solids above a predetermined size while permitting the passage of fats, oils and grease;
    wherein said wastewater outflow opening from said chamber is positioned on said containment body to direct said wastewater stream direction generally downwardly in said interceptor and away from said outflow aperture;
    wherein said containment body comprises at least one generally vertical slot for releasably retaining said at least one solids separating screen within said body;
    wherein said containment body comprises a lid and said at least one solids separating screen may be removed upwardly from said slot when said lid is open;
    wherein said lid comprises rounded slots which can act as handles to manually lift said containment body when said lid is open;
    wherein said lid is hinged to said containment body and consists of two overlapping panels in the closed position; and
    wherein said lid comprises at least one spacing element which, in the closed position projects through at lease one of said rounded slots and engages an underside of a cover of said interceptor.

2. The solids containment device of claim 1, wherein said containment body comprises an upper lip that nests between an underside of the interceptor cover and a ledge on said interceptor to position said device within the interceptor relative to the inlet opening.

3. The solids containment device of claim 1, wherein said at least one removable solids separating screen includes a first solids separating screen, and a second solids separating screen downstream of said first solids separating screen.

4. The solids containment device of claim 3, wherein said first solids separating screen separates out larger solids and said second solids separating screen separates out smaller solids.

5. The solids containment device of claim 1, further comprising a deflecting surface positioned adjacent to said inflow opening.

6. The solids containment device of claim 5, wherein said deflecting surface deflects a wastewater stream in a downward direction.

7. The solids containment device of claim 1, wherein said inflow opening is generally round and said outlet opening is generally larger in area than the inlet and shaped to promote laminar flow characteristics.

8. The solids containment device of claim 1 wherein said containment body comprises an outer bottom wall which is inclined in a downward direction away from said outflow aperture of said interceptor, and wherein said outflow opening directs said wastewater stream along said downward direction of the bottom wall.

9. The solids containment device of claim 1, wherein said lid comprises a hinge pin which is inserted into a hinge hole formed in a side of said containment body.

10. The solids containment device of claim 9, wherein said hinge hole is generally triangular to permit said lid to close tightly.

11. The solids containment device of in claim 1, wherein said containment body is formed from a polymeric material.

12. The solids containment device of claim 1 where both said containment body and said interceptor are formed from a polymeric material.

13. The solids containment device of claim 1, wherein said device may be lifted up out of said interceptor, to be emptied of solids and cleaned.

14. An interceptor for wastewater stream having a solids containment device as claimed in claim 1, wherein said interceptor only intercepts solids.

15. In combination, the solids containment device of claim 1 removably carried within said interceptor.

* * * * *